United States Patent
Schlensker

(10) Patent No.: US 7,329,347 B2
(45) Date of Patent: Feb. 12, 2008

(54) SEPARATING DEVICE

(75) Inventor: Herbert Schlensker, Leverkusen (DE)

(73) Assignee: Beko Technologies GmbH, Neuss (DE)

( * ) Notice: Subject to any disclaimer, the term of this patent is extended or adjusted under 35 U.S.C. 154(b) by 0 days.

(21) Appl. No.: 11/378,191

(22) Filed: Mar. 17, 2006

(65) Prior Publication Data

US 2006/0207943 A1    Sep. 21, 2006

(30) Foreign Application Priority Data

Mar. 19, 2005  (DE) ...................... 10 2005 012 718
Feb. 28, 2006  (DE) ...................... 10 2006 009 542

(51) Int. Cl.
    *B01D 17/02*    (2006.01)
    *B01D 17/022*   (2006.01)
    *C02F 1/40*     (2006.01)
    *C02F 1/28*     (2006.01)

(52) U.S. Cl. ............................. 210/242.2; 210/799

(58) Field of Classification Search ............. 210/242.4, 210/242.2, 799
    See application file for complete search history.

(56) References Cited

U.S. PATENT DOCUMENTS 6,099,723 A *  8/2000  Morris et al. .......... 210/170.03
6,235,201 B1 *  5/2001  Smith et al. ............... 210/691
7,138,055 B2 * 11/2006  Clukies .................... 210/242.4
2004/0226869 A1 * 11/2004  McClure et al. ........... 210/163
2005/0072738 A1 *  4/2005  Weir .......................... 210/691

* cited by examiner

*Primary Examiner*—Thomas M. Lithgow
(74) *Attorney, Agent, or Firm*—McCarter & English, LLP

(57) ABSTRACT

The invention relates to a separating device for separating a first liquid from a second liquid, wherein the first liquid has a lower specific density than the second liquid. The separating device comprises a receptacle with an inside wall, an inlet and an outlet, wherein the inlet is arranged above the outlet, and a separating member made of a permeable filter material that is capable of adsorbing the first liquid and is arranged within the receptacle between the inlet and the outlet and is configured in such a manner that it floats on the second liquid when it is clean, and sinks with the increasing adsorption of the first liquid. The separating member has a smaller diameter than the receptacle so that there is a lateral distance between the inside wall and the floating separating member, and a liquid mixture consisting of the first liquid and the second liquid is filled into the receptacle through the inlet in such a manner that it must flow through the separating member completely so that the separating member can adsorb the first liquid.

9 Claims, 2 Drawing Sheets

SEPARATING DEVICE

CROSS-REFERENCE TO RELATED APPLICATIONS

This application claims priority to German Application No. DE 10 2005 012 718.5, filed Mar. 19, 2005, and German Application No. DE 10 2006 009 542.1, filed Feb. 28, 2006, the contents of which are expressly incorporated by reference in their entirety as part of the present disclosure.

BACKGROUND

The present invention relates to a separating device for separating a first liquid from a second liquid and, wherein the first liquid has a lower specific density than the second liquid.

Such separating devices are necessary in compressed-air applications, for example. Air compressors generate compressed air by taking in and compressing ambient air. The contained air moisture condenses due to physical conditions and the drying of the compressed air. This condensate is a type of sewage that in most cases must not be discharged into the public sewer because it contains air compressor lubricants, and therefore the permissible hydrocarbon concentration limits are exceeded.

A volume flow rate of 60 $m^3$ of intake air per hour may result in a mostly discontinuous condensate flow of 1.6 l/h that may be loaded with 300 mg of oil per hour which is equivalent to 190 ppm. There are different forms of bonding between water and lubricant, ranging from oil/water mixture via dispersion to emulsion. In Germany, the permissible amounts for discharge into a sewer are 20 or 10 ppm, in some cases 5 ppm. Thus, the condensate represents hazardous waste the disposal of which is expensive. That is why various methods and devices have been developed for separating the contained oil from the water.

Devices for separating liquids or dissociating devices for dissociating liquids are known. For example, utility model DE 90 040 19.8 describes a device for sucking off light liquid separated in a liquid separator. Said liquid separator comprises a housing in which a receptacle is arranged. A bag filled with an oil-binding agent is arranged in the receptacle. The oil-binding agent is a floatable granulated material based on polyurethane foam. The sewage contaminated with light liquid enters the housing through the entrance port. As long as the oil-binding agent in the receptacle is largely unsaturated, the receptacle only slightly immerses in the light liquid layer. The light liquid penetrates the receptacle and the bag containing the oil-binding agent and is adsorbed by the oil-binding agent. With the increasing saturation of the oil-binding agent, the weight of the bag is also increasing so that the receptacle is continuously sinking. When the receptacle reaches its lowest position, the oil-binding agent is largely saturated with light-density material and the bag may be replaced. The non-adsorbed liquid escapes through an outlet. Basically, the principle of this device is useful, but the device itself is very costly and susceptible to failure. For example, there is no guarantee that the entire volume of the liquid mixture actually flows through the bag so that complete filtering is not inevitably ensured.

On the basis of this device, DE 600 04 523 D2 also describes a dissociating device and a dissociating method for dissociating liquids of different densities. Basically, the device described therein operates according to the same principle, i.e. that an adsorbing material is saturated with one of the two liquids and sinks in the other liquid because of that. However, an essential difference is that in this device the entire volume flow must pass through the dissociating component that consists of an adsorbing material. The dissociating component is arranged within a receptacle in such a manner that it completely fills the cross-section of the receptacle. However, the friction between the dissociating component and the receptacle is a disadvantage of this device. With the increasing adsorption or contamination of the dissociating component and because of temperature and pressure variations, the frictional conditions are also changing which has an influence on the filtering process and the required expenditure of energy. Thus, the device is susceptible to failure and may require more maintenance.

Another disadvantage of the described devices is that they are not capable of treating highly dispersed or even highly emulsified condensates. Usually, more costly methods must be used, such as membrane, evaporating, or cracking methods.

SUMMARY OF THE INVENTION

The object of the present invention is to provide a separating device that enables a first liquid to be reliably separated from a second liquid, wherein the first liquid has a lower specific density than the second liquid. The separating device comprises a receptacle with an inside wall, an inlet and an outlet, wherein the inlet is arranged above the outlet, and a separating member made of a permeable filter material that is capable of adsorbing the first liquid. The separating member is arranged within the receptacle between the inlet and the outlet and is configured in such a manner that it floats on the second liquid when it is clean and sinks with the increasing adsorption of the first liquid. It is required that the device is constructed as simply as possible and even withstands extreme operational conditions, and that maintenance work, such as checking and replacing filters, can be performed easily and quickly.

According to the invention, the object is achieved in that the separating member has a smaller diameter than the receptacle so that in operation there is a lateral distance between the inside wall and the floating separating member, and a liquid mixture consisting of the first liquid and the second liquid is filled into the receptacle through the inlet in such a manner that it must flow through the separating member completely so that the separating member can adsorb the first liquid.

Thus, the essential advantage of the present invention is that the separating member that consists of an adsorbing material floats on the surface of the already filtered liquid without laterally contacting the inside wall of the receptacle. Because the liquid is still passed through the separating member, all disadvantages resulting from the friction between the separating member and the inside wall of the receptacle are eliminated. With increasing adsorption, the weight or mass of the separating member is also increasing so that it is continuously sinking in the surrounding liquid. The filter material above the surface of the already filtered liquid takes up oil by capillary action. The premature blocking of the filter material through which the condensate flows is prevented, and at the same time there is always clean unsaturated filter material near the surface of the surrounding liquid because of the continuous sinking of the separating member.

Advantageously, the separating member is shaped like a pot with an internal cavity, and the flow is passed through it from the inside to the outside so that free proportions of oil, even with densities of nearly 1 $kg/dm^3$, are inevitably contacted with the separating member. Thus, a self-regulating face area is formed because an increasing amount of condensate results in an increasing liquid level in the separating member due to increasing flow resistance. The same applies to the increasing exhaustion of the separating member. The filling of the separating member is preferably performed centrally towards the internal cavity by means of a guide pipe so that the lateral swerving of the floating separating member is prevented or restricted.

It has also turned out to be advantageous to keep the separating member in a central position by use of aids, such as a stay, thereby providing additional means for preventing lateral floating-away.

The configuration of the separating device according to the invention prevents the occurrence of a performance-decreasing bypass. Moreover, the separating member can never completely clog the device in which it is arranged because the supplied liquid mixture will flow out of the separating member and down the side of the separating member if the separating member is completely clogged and impermeable. This will certainly eliminate the filter effect, but the device will not be blocked.

The separating member preferably consists of a material that takes up almost no water. This provides the advantage that thermal processing can be performed without any problems and also with almost no residues on account of the absence of water and the type of the selected materials. Such materials are known. For example, oleophilic polypropylene may be used.

In particular, the separating device according to the invention is particularly efficient if it is combined with additional separating or filtering components. For example, a preseparator, in which the liquid mixture initially stays, may be arranged upstream the separating device. The preseparator takes up suspended matter so that the filter stages are not subjected to any performance-decreasing loads. The preseparator may be cleaned quickly and easily by means of an outlet in its bottom.

The free proportions of oil floating on the surface in the preseparator may be optionally discharged via an oil discharge pipe into a separate collecting receptacle. With most oil sorts, the largest part of the free oil with a proportion of water can settle on the surface within less than 60 minutes. By shifting the oil discharge pipe upwards, the preseparator is prevented from overflowing when the full collecting receptacle must be replaced, for example. The differential height between the oil discharge pipe and the inlet of the receptacle of the separating device is adjustable so that the layer thickness that prevents water from entering the collecting receptacle in the event of a surge-like inflow can always be adjusted corresponding to the density of the oil.

On principle, the two filter stages should be passed from top downwards. Thus, proportions of oil that have a higher density than water will not clog any function-relevant conduits.

Another advantage will be achieved if the separating member acts as a preliminary filter and a main filter is arranged within the receptacle. This main filter is preferably arranged below the separating member. Thus, the liquid leaving the separating member reaches the main filter, passes through it and flows through the outlet out of the receptacle. The main filter is adapted to the dimension of the receptacle in such a manner that the entire liquid must flow through the main filter. Preferably, the main filter fills the entire cross-section of the receptacle.

The densities of the separating member and the main filter are adapted to the respective liquid flowing through, thereby preventing the formation of channels and thus the liquid from flowing through an essentially exhausted member.

Moreover, the separating member and the main filter are exactly adapted to the respective application with respect to the face areas, quantities and retention times and are designed economically. The main filter also consists of a filter medium that takes up almost no water.

Advantageously, the separating member and also the main filter generally meet the "Requirements to oil-binding agents" published by the Federal Ministry.

Preferably, the main filter is arranged within the receptacle in such a manner that the liquid is supplied and discharged centrally and in each case the entire cross-sectional area of the main filter is available so that no liquid bypass can occur.

Moreover, the main filter may consist of a material capable of separating liquids containing finely dispersed and even emulsified oils in such a manner that they can be discharged. For example, oleophilic melt-spun polymer with a distribution-oriented surface compression and texture as well as activated carbon of adapted consistency and size for taking up finest oil droplets and oleophilic foamed polymer are suitable and prevent blocking by an oil coating on the filter medium.

Advantageously, a riser is arranged on the pure water side downstream the outlet of the receptacle, said riser ensuring long retention times and a good distribution of the liquid in the filter stages.

For facilitating maintenance work and ensuring even separation by the filter, level indicators may be provided that indicate the exhaustion of the separating or filter stages. For example, the separating member is preferably provided with a level indicator that indicates how deep the separating member has sunk. Moreover, a level indicator may indicate the accumulation of liquid within the separating member or within the main filter.

The present invention will now be explained in detail with reference to the accompanying drawings. It is to be understood that the depicted figures are exemplary only and not restrictive of the invention.

DETAILED DESCRIPTION OF THE INVENTION

Figure 1:
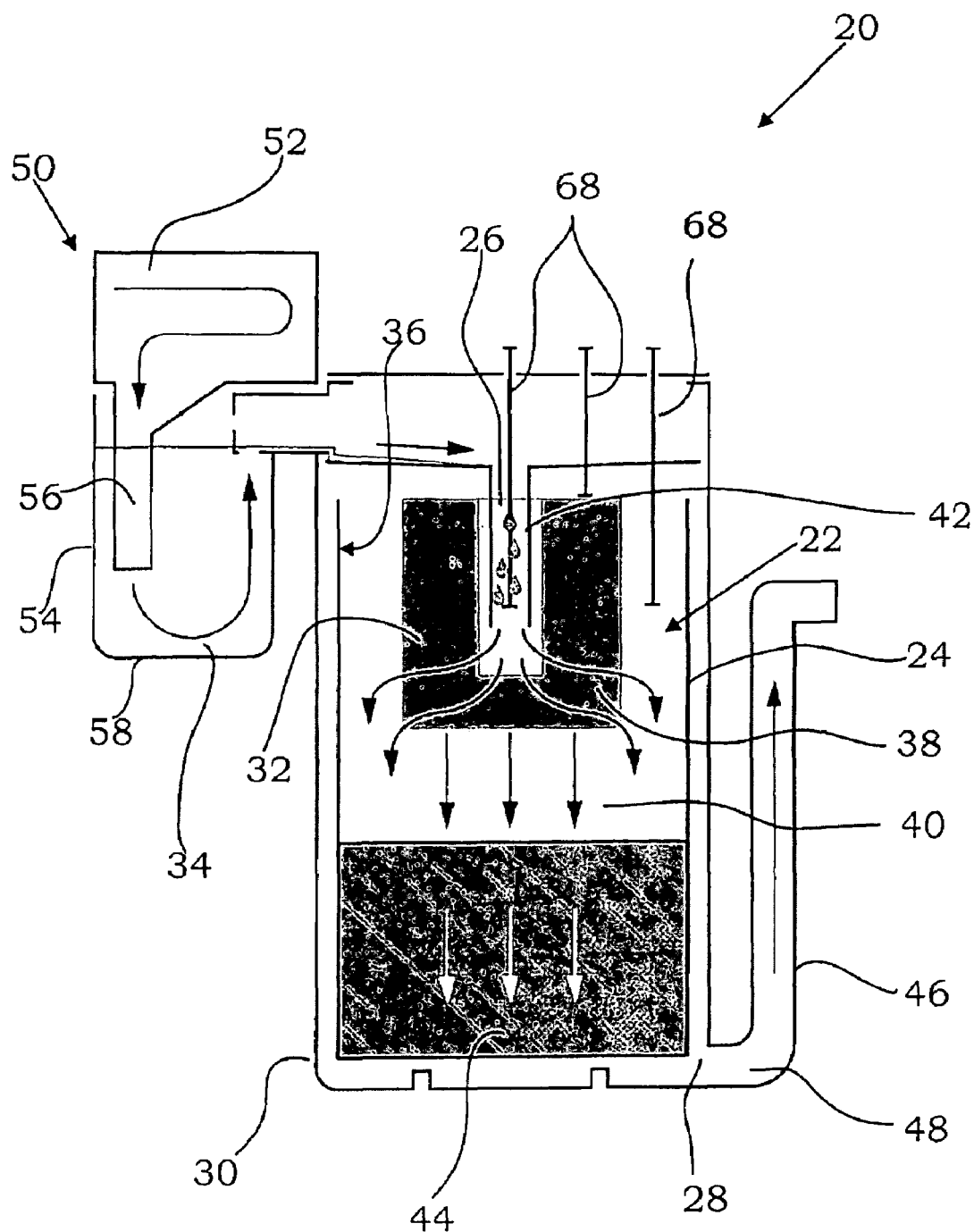
FIG. 1: a first embodiment of a condensate-processing device for separating or dissociating oil from water.

The flow direction of the liquids is indicated by the arrows.

Both condensate-processing devices 20 depicted in the figures illustrate the principle of the inventive separating device 22. The separating device 22 is arranged within a receptacle 24 that comprises an inlet 26 and an outlet 28. In the illustrated embodiment, the receptacle 24 is arranged within a housing 30. The receptacle 24 may be shorter than shown herein. An optional seal may be arranged between the receptacle 24 and the housing 30. However, the receptacle 24 may be configured in such a manner that the housing 30 is omitted.

The separating device 22 comprises a separating member 32 that is arranged between the inlet 26 and the outlet 28, i.e. above the outlet 28 and below the inlet 26. Preferably, the separating member 32 is pot-shaped, wherein a liquid mixture 34 is supplied through the inlet 26 in such a manner that the liquid mixture 34 is passed through the separating member 32 from the inside to the outside. The inlet 26 is arranged as centrally as possible with respect to the pot-shaped separating member 32, thereby achieving an even distribution or accumulation of the liquid mixture 34 within an internal cavity 42.

It is another essential feature of the invention that the separating member 32 comprises outside dimensions or a cross-section that are smaller than an inner cross-section of the receptacle 24. Thus, the separating member 32 does not contact the inside wall 36 of the receptacle 24.

The liquid mixture 34 consists of a first liquid 38 and a second liquid 40. The first liquid 38 is preferably oil, while the second liquid 40 is water.

When the liquid mixture 34 is passed through the separating member 32, the separating member 32 adsorbs the first liquid 38 and passes the second liquid 40 through. The separating member 32 is configured in such a manner that it floats on the second liquid 40 when no or only little first liquid 38 has been taken up by it. This is particularly achieved by using a material for the separating member 32 that has the same or a lower specific density as/than the second liquid 40.

Figure 2:
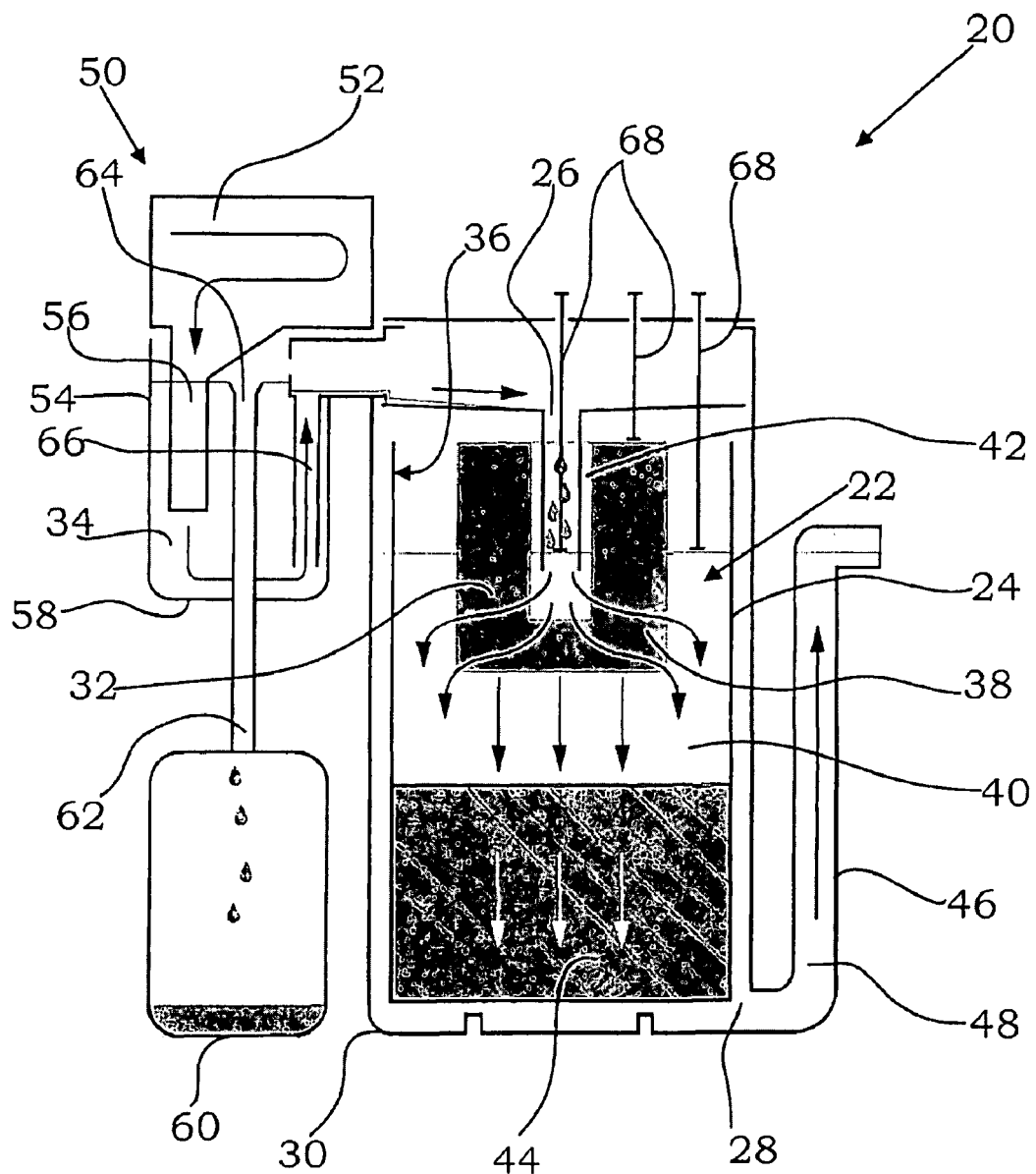
FIG. 2: a second embodiment of a condensate-processing device according to the invention.

In FIGS. 1 and 2, the condensate-processing device 20 is already in operation so that a certain proportion of the second liquid 40 has already been passed through the separating member 32 and the separating member 32 is floating on said second liquid 40 or has already sunk in it, respectively.

That means that the adsorption of the first liquid 38 results in a gradually increasing weight of the separating member 32 so that the latter sinks in the second liquid 40. Due to capillary action, the first liquid 38 rises within the separating member 32 to the region above the liquid level of the second liquid. The steady sinking process has the effect that the first liquid 38 can always be in contact with material of the separating member 32 that is clean and still unused and capable of adsorbing.

Both shown condensate-processing devices 20 comprise a main filter 44 that is arranged downstream the separating member 32 or the separating device 22, respectively. The main filter 44 is arranged below the separating member 32 and is configured in such a manner that it fills the cross-section of the receptacle 24 which means that the entire second liquid 40 leaving the separating device 22 is forced to pass through the main filter 44 in order to reach the outlet 28. The main filter 44 consists of, for example, oleophilic melt-spun polymer with a distribution-oriented surface compression and texture, activated carbon of adapted consistency and size for taking up finest oil droplets, or oleophilic polymer. Thus, the main filter 44 is capable of separating condensates containing finely dispersed and even emulsified oils.

An intermediate processing stage is formed between the separating member 32 and the main filter 44, as it were. This intermediate stage provides the liquid leaving the separating member 32 with additional retention time for separating free proportions of the first liquid 38 that has not been held back yet. Moreover, the proportions still to be filtered get in contact with the outer surface of the separating member 32 in this region.

Advantageously, a riser 46 is arranged downstream the main filter 44 in which riser 46 the pure water 48 leaving the main filter 44 can rise. The riser 46 provides long retention times and ensures a good distribution of the liquids in the condensate-processing device.

Moreover, both figures show an embodiment in which a preseparator 50 is arranged upstream the separating device 22. The liquid mixture 34 flows through an intake member 52 into an intake pot 54 and rises therein. The intake member 52 comprises a nozzle 56 that leads the liquid mixture 34 to a region near a bottom 58 of the intake pot 54. The preseparator 50 takes up suspended matter so that the subsequent filter stages are not subjected to any performance-decreasing loads. The liquid mixture 34 then flows out of the preseparator 50 and through the inlet 26 towards the separating member 32.

According to FIG. 2, the preseparator 50 may also be configured in such a manner that free proportions of oil or free proportions of the first liquid 38 already floating on the surface in the preseparator are discharged. For this purpose, a separate collecting receptacle 60 is provided that is connected to the intake pot 54 via a conduit 62. An opening 64 in the conduit 62 is arranged in such a manner that rising proportions of the first liquid 38 can migrate through the opening 64 into the conduit 62 and eventually into the collecting receptacle 60. The remaining liquid mixture 34 is supplied to the inlet 26 via a riser 66.

Moreover, level indicators 68 may be provided that can indicate the exhaustion of the separating member 32 and of the main filter 44. The latter are exhausted when the liquid level in the internal cavity 42 of the separating member 32 rises, the separating member 32 sinks, and liquid accumulates within the receptacle 24. Commercially available devices may be used as level indicators 68.

The inventive separating device 22 may be connected to the preseparator 50 via the inlet 26 and connected to the riser 46 via the outlet 28 as well as comprise the described main filter 44. Alternatively, the separating device 22 may be combined with one or some of the mentioned components only. The connection to the described components depends on the respective application.

The invention is not limited to the embodiments described above, but includes all equally acting embodiments.

Further advantages of the invention will be apparent from the following patent claims.

What is claimed is:

1. A separating device for separating a first liquid from a second liquid, wherein the first liquid has a lower specific density than the second liquid, comprising:
   a receptacle with an inside wall;
   an inlet and an outlet, wherein the inlet is arranged above the outlet; and
   a separating member made of a permeable filter material that is capable of adsorbing the first liquid and is arranged within the receptacle between the inlet and the outlet and is configured in such a manner that it floats on the second liquid when it is clean, and sinks with increasing adsorption of the first liquid,
   wherein the separating member has a smaller diameter than the receptacle so that there is a lateral distance between the inside wall and the floating separating member, and a liquid mixture consisting of the first liquid and the second liquid is filled into the receptacle through the inlet in such a manner that it must flow through the separating member completely so that the separating member can adsorb the first liquid; and
   wherein the separating member has an internal cavity and an inlet opening that is oriented towards the inlet, the internal cavity being surrounded by said filter material except for the inlet opening and that the liquid mixture is filled into the internal cavity.

2. The separating device of claim 1, wherein the separating member is pot-shaped and has an internal cavity and a pot opening that is oriented towards the inlet, and that the liquid mixture is filled into the internal cavity.

3. The separating device of claim 1, wherein the separating member is guided in its center line and thus held within the receptacle.

4. The separating device of claim 1, wherein a main filter is arranged within the receptacle between the separating member and the outlet and is configured in such a manner that the second liquid leaving the separating member is passed through the main filter to the outlet.

5. The separating device of claim 4, wherein a riser is arranged downstream the outlet in which riser the pure water leaving the main filter rises.

6. The separating device of claim 1, wherein the inlet is connected to a preseparator in which suspended matter is separated from the liquid mixture.

7. The separating device of claim 6, wherein the preseparator is configured in such a manner that free proportions of the first liquid are also separated.

8. The separating device of claim 1, wherein level indicators are provided that indicate the exhaustion of the separating member.

9. The separating device of claim 1, wherein level indicators are provided that indicate the exhaustion of at least one of (i) the main filter and (ii) the separating member.

* * * * *